United States Patent [19]

Mehrgardt et al.

[11] Patent Number: 4,901,151

[45] Date of Patent: Feb. 13, 1990

[54] TELEVISION RECEIVING SECTION WITH DIGITAL STAGES

[75] Inventors: Sonke Mehrgardt, March; Dietmar Ehrhardt, Freiburg, both of Fed. Rep. of Germany

[73] Assignee: Deutsche ITT Industries GmbH, Freiburg, Fed. Rep. of Germany

[21] Appl. No.: 288,550

[22] Filed: Dec. 22, 1988

[30] Foreign Application Priority Data

Dec. 23, 1987 [DE] Fed. Rep. of Germany ....... 3743727
Oct. 31, 1988 [EP] European Pat. Off. ........... 88118095

[51] Int. Cl.$^4$ ......................... H04N 5/44; H04N 5/60
[52] U.S. Cl. .................................. 358/188; 358/197; 358/198
[58] Field of Search ............... 358/188, 160, 166, 196, 358/197, 198

[56] References Cited

U.S. PATENT DOCUMENTS

| 4,709,270 | 11/1987 | Mehrgardt | 358/198 |
| 4,710,814 | 12/1987 | Gassmann | 358/197 |
| 4,782,385 | 11/1988 | Gunter | 358/188 |
| 4,811,096 | 3/1989 | Gakumura | 358/188 |

OTHER PUBLICATIONS

Jack E. Volder, "The CORDIC Trigonometric Computing Technique," *IRE Transaction on Electronic Computers*, Sep. 1959, pp. 330–334.

*Primary Examiner*—Tommy P. Chin
*Attorney, Agent, or Firm*—Thomas L. Peterson

[57] ABSTRACT

A television receiving section includes only a single A/D converter, and, thus, only a single interface between the analog portion and the digital portion. Preferably, the A/D converter is positioned after the intermediate-frequency stage of the television receiving section. The A/D converter is clocked at about 20 MHz. The digital portion of the television receiving section includes a video channel and an audio channel. The video channel includes at its input end a band-pass filter whose passband extends from 1 MHz to 6 MHz and whose output signals are fed directly and through a 90° phase shifter to a first absolute-value stage, which delivers the digital composite color signal. The audio channel includes at its input end a quadrature mixer (operating from a locally generated clock having a frequency of 7 MHz to 7.5 MHz) whose two output signals are fed through a first decimator and a second decimator, respectively, to a second absolute-value stage and an angle-computing stage. The output of the angle-computing stage delivers a frequency-demodulated audio signal through a differentiating stage. The output of the second absolute-value stage provides an amplitude-demodulated audio signal.

6 Claims, 2 Drawing Sheets

TELEVISION RECEIVING SECTION WITH DIGITAL STAGES

RELATED APPLICATION

The priority of Application P 37 43 727.5, made in the Federal Republic of German on Dec. 23, 1987, is claimed.

BACKGROUND OF THE INVENTION

1. Field of the Invention

The present invention is in the field of digital television, and, more particularly, in the field of digital television receivers that receive a standard television broadcast signal in analog form and convert it to a digital representation for further processing of the signal in a digital form.

2. Description of the Related Art

Present-day, so-called digital television receivers generally contain at least two A/D converters ("analog-to-digital converters"). One of the A/D converters serves to convert the video signal from analog to digital form and is commonly located after the so-called sound trap, which keeps the sound-carrier signal out of the remaining signal. This first A/D converter is operated with a sampling signal whose frequency is usually four times the chrominance subcarrier frequency. Typically, this first A/D converter is a flash converter.

The second A/D converter is located at the beginning of the audio channel and, unlike the first-mentioned A/D converter, is generally a delta-sigma converter.

SUMMARY OF THE INVENTION

During the further development and refinement of the current principle of a digital television receiver, it has turned out that each of the various current television standards, and also expected future television standards, require suitably designed subcircuits which lead to a great number of different types of integrated circuits. This is disadvantageous, particularly with regard to the mass production of integrated circuits.

It is, therefore, the object of the invention as claimed to provide a circuit principle for television receiving sections having at least one interface between the analog signal processing circuitry and the digital signal-processing circuitry which permits considerably simpler adaptation to different television standards and reduces the number of A/D converters required.

The main idea underlying the invention is to use a single A/D converter already at the output of the intermediate-frequency stage (i.e., where the signal, still in its analog format, lies in a frequency range between about 30 MHz and 40 MHz). The clock signal of this A/D converter has a frequency approximately equal to twice the bandwidth of the received signal (e.g., a frequency of about 20 MHz). After this A/D converter, the received signal is divided into a video-information-processing channel ("the video channel"), and an audio-information processing channel ("the audio channel"). Compared to the conventional solution described above, the need for the separate audio-channel A/D converter is eliminated, so that in a currently marketable system, a complete integrated circuit is saved.

BRIEF DESCRIPTION OF THE DRAWINGS

The invention will now be explained in greater detail with reference to the accompanying drawings, in which.

DESCRIPTION OF THE PREFERRED EMBODIMENT

Figure 1:
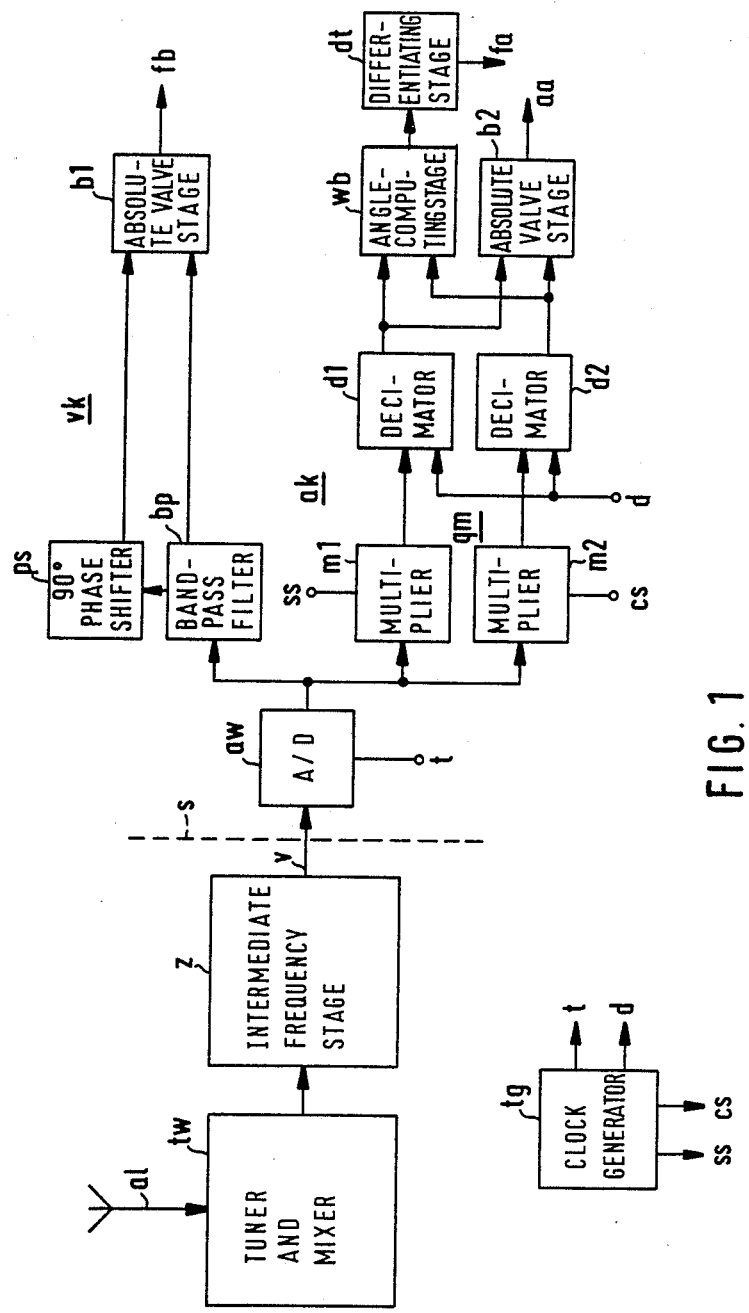
FIG. 1 is a block diagram of an embodiment of the invention.

FIG. 1 shows the portion of a television receiver of video recorder to which the invention relates, namely the television receiving section. As usual, an antenna signal al is fed to a tuner and mixer tw, which is implemented in any of the conventional technologies. The tuner and mixer tw is followed by an intermediate-frequency stage z, which provides a video- and audio-information-containing signal v at the intermediate frequency. The video- and audio-information-containing signal v is converted by means of a single A/D converter aw, whose clock signal t has a frequency of about 20 MHz, into a digital signal whose frequency band extends from about 1 MHz to about 9 MHz. The clock signal t is generated by a clock generator tg. Thus, there is only a single interface s between the analog signal-processing circuitry and the digital signal-processing circuitry.

The output of the A/D converter aw feeds a video-information-processing channel vk, called "video channel", and an audio-information-processing channel ak, called "audio channel". The video channel vk includes a band-pass filter bp at its input end. The band-pass filter bp has a passband that extends between 1 MHz and 6 MHz. The bandpass filter bp has two outputs that are connected directly and through a 90° phase shifter ps, respectively, to the inputs of a first stage b1. The first stage b1 produces an output equal to the magnitude of the vector sum of its two input signals (i.e., the square root of the sum of the squares of its two input signals), and is henceforth called the "first absolute-value stage" b1. The output of the first absolute-value stage b1 provides a digital composite color signal fb.

The audio channel ak includes a quadrature mixer qm at its input end. The quadrature mixer qm operates in response to two locally generated signals, a digital sine wave signal ss and a digital cosine-wave signal cs, which are generated by the clock generator tg and have the same television-standard-dependent fixed frequency (i.e., a frequency between 7 MHz and 7.5 MHz). The quadrature mixer qm comprises two multipliers m1, m2, which are fed with the digital sine-wave signal ss and the digital cosine-wave signal cs, respectively.

Each of the two output signals of the quadrature mixer qm is converted by means of one of two decimators dl, d2 from the high frequency of the clock signal t to the lower frequency of a sampling signal d, also from the clock generator tg. The lower frequency is suitable for the subsequent signal-processing circuitry.

The outputs of the two decimators d1, d2 are connected to the two inputs of a second stage b2 that produces an output equal to the magnitude of the vector sum of its input signals. The second stage b2 is henceforth called the "second absolute-value stage" b2. The outputs of the two decimators d1, d2 are also connected to the two inputs of a stage wb that computes the angle between its two input signals, and which is henceforth called the "angle-computing stage" wb.

The angle-computing stage wb is followed by a differentiating stage dt, whose output provides a frequency-demodulated audio signal fa when such a signal is being received. The output of the second absolute-value stage b2 provides an amplitude-demodulated audio signal aa when such a signal is being received. For standards with more than one sound carrier, a corresponding number of audio channels ak must be provided. The two absolute-value stages b1, b2 and the angle-computing stage wb are preferably circuits employing the CORDIC computing technique, as described, for example, in Jack E. Volder, "The CORDIC Trigonometric Computing Technique," *IRE Transaction on Electronic Computers*, September 1959, pp. 330–334.

The circuits following the two absolute-value stages b1, b2 and those following the differentiating stage dt are of the kind commonly used for digital signal processing in television receiving sections, and are not shown herein.

Figure 2:
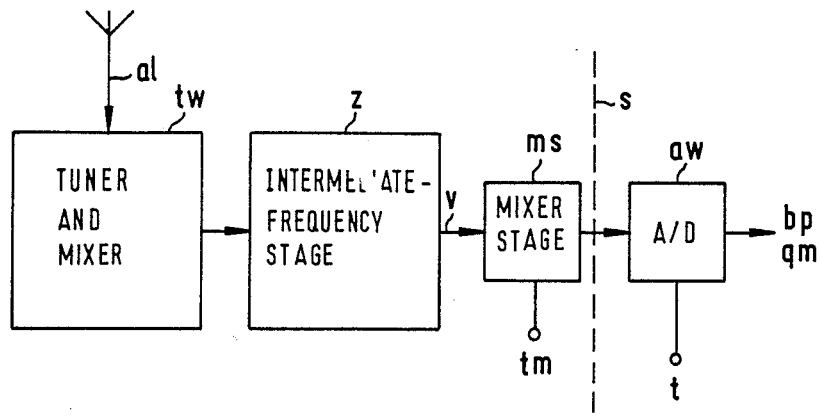
FIG. 2 is a block diagram of a portion of the arrangement of FIG. 1 representing a development of the invention.

FIG. 2 shows a development of the arrangement of FIG. 1 for the case where the frequencies at the output of the intermediate-frequency stage z are substantially higher than the frequency of the clock signal t of the A/D converter aw. In this case, the A/D converter aw must meet very high accuracy requirements because the variations in the sampling instant (the so-called aperture jitter) result in uncorrectable distortions of the A/D-converted signal. Because of these accuracy requirements, the mixer stage ms is interposed between the output of the intermediate-frequency stage z and the input of the A/D converter aw. The mixer stage ms is fed with a locally generated signal tm, whose frequency is an integral multiple of the frequency of the clock signal t. This latter measure prevents aliasing effects during the A/D conversion. In FIG. 2, the clock generator tg, also generates the signal tm.

Figure 3:
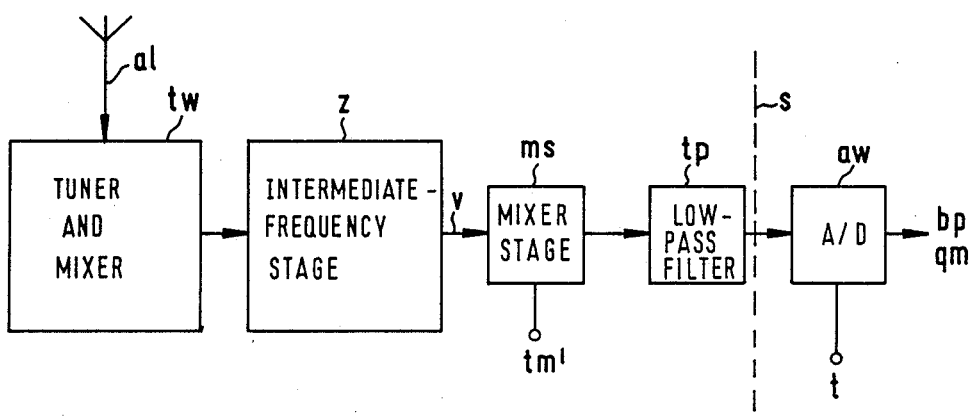
FIG. 3. is a block diagram of a portion of the arrangement of FIG. 1 representing a further development of the invention.

FIG. 3 shows a further development of the arrangement of FIG. 1 for the case where the signal at the output of the intermediate-frequency stage z is already a band-limited signal. Then, the locally generated signal tm of FIG. 2 is preferably a square-wave signal tm' (FIG. 3), from which the clock signal t can be derived by frequency division. The clock generator tg" of FIG. 3 then includes a frequency-divider circuit to generate the clock signal t.

FIG. 3 also shows that it may be advantageous to place between the mixer stage ms and the A/D converter aw a low-pass filter tp, by which higher-frequency signal components at the output of the mixer stage ms are suppressed. The cutoff frequency of the low-pass filter tp must be chosen accordingly.

In the present invention, adjustments to the different television standards and their numerical values are made exclusively on the digital side of the signal-processing circuitry, so they are much easier to implement than in conventional television receiving sections, where the adaptation to the standard-dependent numerical values must still be made partly on the side of the analog signal-processing circuitry.

The invention is preferably implemented with integrated circuits, using the specific technology best suited for the individual parts, i.e., both the best suited fabrication technology for the semiconductor chip and the best suited basic circuit technology.

What is claimed is:

1. A television receiving section having analog and digital stages, said television receiving section including a tuner and mixer stage that receives a received signal and an intermediate frequency stage that provides a video- and audio-information-containing signal responsive to said received signal at an intermediate frequency, said television receiving section having at least one interface between said analog and digital stages, said television receiving section comprising:

a single analog-to-digital (A/D) converter driven by a sampling clock signal having a frequency approximately equal to twice the bandwidth of said received signal, said single A/D converter receiving an analog signal responsive to said video- and audio-information-containing signal and providing a digital output signal at a rate determined by the frequency of said sampling clock signal;

a video-information processing channel having an input and an output, said input receiving said digital output signal from said A/D converter, said video-information processing channel comprising:

a band-pass filter (bp) having a passband that extends between 1 MHz and 6 MHz, said band-pass filter having an input that receives said digital output signal from said A/D converter, said band-pass filter having an output that provides a band-pass filtered output signal;

a 90° phase shifter having an input that receives said band-pass filtered output signal from said band-pass filter and provides a phase-shifted output signal shifted in phase by 90° from said band-pass filtered output signal; and a first absolute-value stage having two inputs and an output, one of said inputs receiving said band-pass filtered output signal from said band-pass filter and the other of said inputs receiving said phase-shifted output signal from said 90° phase shifter, said first absolute-value stage producing an output equal to the magnitude of the vector sum of its two input signals, said output of said first absolute-value stage being a digital composite color signal;

and an audio-information processing channel having an input and an output, said input receiving said digital output signal from said A/D converter, said audio-information processing channel comprising:

a quadrature mixer having an input and two outputs, said input receiving said digital output signal from said A/D converter, said quadrature mixer responsive to two locally generated signals having the same, frequency-standard-dependent, fixed frequency, said fixed frequency being between 7 and 7.5 MHz, said quadrature mixer providing first and second output signals on said two outputs;

a first decimator having a signal input and a signal output and having a decimator clock input driven by a decimator clock signal having a frequency lower than the frequency of said sampling clock, said signal input of said first decimator receiving said first output signal from said quadrature mixer, said first decimator providing a first decimator output signal on said signal output at a rate determined by said decimator clock signal;

a second decimator having a signal input and a signal output and having a decimator clock input driven by said decimator clock signal, said signal input of said second decimator receiving said second output signal from said quadrature mixer, said second decimator providing a second decimator output signal on said signal output at a rate determined by said decimator clock signal;

a second absolute-value stage having first and second inputs and an output, said first input receiving said first decimator output signal and said second input receiving said second decimator output signal, said second absolute-value stage producing an output signal on said output equal to the magnitude of the vector sum of said first and second decimator output signals;

an angle-computing stage having first and second inputs and an output, said first input receiving said first decimator output signal and said second input receiving said second decimator output signal, said angle computing stage computing the angle between said first decimator output signal and said second decimator output signal and providing an output signal responsive to said computed angle, said output of said second absolute-value stage being an amplitude-demodulated audio signal when an amplitude-demodulated input signal is received by said audio-information-processing channel; and a differentiating stage having an input an output, said input of said differentiating stage receiving said output of said angle-computing stage, said output of said differentiating stage being a frequency-demodulated audio signal when a frequency-modulated input signal is received by said audio-information-processing channel.

2. The television receiving section as defined in claim 1 wherein said input of said A/D converter is connected directly to the output of said intermediate frequency stage.

3. The television receiving section as defined in claim 1, further comprising a mixer stage interposed between the output of said intermediate-frequency stage and the input of said A/D converter, said mixer stage being fed by a locally generated signal whose frequency is an integral multiple of the frequency of said sampling clock signal.

4. The television receiving section as defined in claim 3, wherein said locally generated signal is a square-wave signal, and wherein said sampling clock signal is derived from the locally generated signal by integral frequency division.

5. The television receiving section as defined in claim 3, wherein the output of the intermediate-frequency stage is a band-limited signal, and wherein a low-pass filter is interposed between the output of said mixer stage and the input of said A/D converter.

6. The television receiving section as defined in claim 5, wherein said locally generated signal is a square-wave signal, and wherein said sampling clock signal is derived from the locally generated signal by integral frequency division.

* * * * *